US008978108B2

(12) United States Patent
Zeng et al.

(10) Patent No.: US 8,978,108 B2
(45) Date of Patent: Mar. 10, 2015

(54) METHOD, DEVICE, AND SYSTEM FOR SERVICE PRESENTATION

(75) Inventors: Qiuchang Zeng, Chengdu (CN); Yuqing Zhang, Nanjing (CN); Yan Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 426 days.

(21) Appl. No.: 13/457,720

(22) Filed: Apr. 27, 2012

(65) Prior Publication Data

US 2012/0278856 A1 Nov. 1, 2012

Related U.S. Application Data

(63) Continuation of application No. PCT/CN2010/078205, filed on Oct. 28, 2010.

(30) Foreign Application Priority Data

Oct. 30, 2009 (CN) .......................... 2009 1 0211376

(51) Int. Cl.
G06F 7/04 (2006.01)
G06F 17/30 (2006.01)
H04L 29/06 (2006.01)
H04L 9/32 (2006.01)
G06F 21/00 (2013.01)
(Continued)

(52) U.S. Cl.
CPC ............... *H04W 12/08* (2013.01); *G06Q 30/04* (2013.01)
USPC ................. 726/4; 726/26; 713/165; 713/168; 713/170; 705/51; 705/53; 705/67; 705/69; 705/75

(58) Field of Classification Search
USPC ................... 726/3, 4, 26; 713/165, 168, 170; 705/51, 53, 67, 69, 75
See application file for complete search history.

(56) References Cited

U.S. PATENT DOCUMENTS

| 7,370,364 | B2 | 5/2008 | Dobbins et al. |
| 2002/0157002 | A1 | 10/2002 | Messerges et al. |

(Continued)

FOREIGN PATENT DOCUMENTS

| CN | 1852368 A | 10/2006 |
| CN | 1980409 A | 6/2007 |

(Continued)

OTHER PUBLICATIONS

Foreign Communication From a Counterpart Application, PCT Application PCT/CN2010/078205, Written Opinion dated Feb. 17, 2011, 5 pages.
Foreign Communication From a Counterpart Application, Chinese Application No. 200910211376.6, Chinese Office Action dated Oct. 8, 2012, 6 pages.

(Continued)

*Primary Examiner* — Aravind Moorthy
(74) *Attorney, Agent, or Firm* — Conley Rose, P.C.; Grant Rodolph; Nicholas K. Beaulieu

(57) ABSTRACT

A method, device and system for service presentation, which includes: receiving a presentation request message; acquiring presentation information from the presentation request message; storing the presentation information; when the presentee accesses the presented content, receiving an authentication and rating request message transmitted from the service enabling component; performing authenticating and rating according to the authentication and rating request message and the stored presentation information. The present invention is applicable to presenting content type services and so on.

19 Claims, 4 Drawing Sheets

(51) Int. Cl.
   *G06Q 20/00* (2012.01)
   *H04W 12/08* (2009.01)
   *G06Q 30/04* (2012.01)

(56) References Cited

U.S. PATENT DOCUMENTS

| | | | |
|---|---|---|---|
| 2005/0255886 | A1 | 11/2005 | Aaltonen et al. |
| 2006/0212930 | A1* | 9/2006 | Shull et al. ............... 726/10 |
| 2006/0259424 | A1 | 11/2006 | Turcotte et al. |
| 2006/0272028 | A1 | 11/2006 | Maes |
| 2008/0194231 | A1 | 8/2008 | Kim et al. |
| 2009/0172033 | A1* | 7/2009 | Clark et al. ............ 707/104.1 |
| 2011/0047182 | A1* | 2/2011 | Shepherd et al. .......... 707/780 |
| 2011/0314135 | A1* | 12/2011 | Castrogiovanni et al. .... 709/219 |

FOREIGN PATENT DOCUMENTS

| | | |
|---|---|---|
| CN | 101540782 A | 9/2009 |
| RU | 2260918 C2 | 9/2005 |

OTHER PUBLICATIONS

Foreign Communication From a Counterpart Application, Chinese Application No. 200910211376.6, English Translation of Chinese Office Action dated Oct. 8, 2012, 3 pages.

Foreign Communication From a Counterpart Application, European Application No. 10826101.7, Extended European Search Report dated Oct. 12, 2012, 7 pages.

"Notice from the European Patent Office dated Oct. 1, 2007, Concerning Business Methods," Office Journal EPO, vol. 30, No. 11, Nov. 1, 2007, pp. 592-593.

Foreign Communication From a Counterpart Application, Russian Application No. 2012122168, Russian Office Action dated Nov. 26, 2013, 5 pages.

Foreign Communication From a Counterpart Application, Russian Application No. 2012122168, English Translation of Russian Office Action dated Dec. 23, 2013, 7 pages.

International Search Report of the International Searching Authority related to Application No. PCT/CN2010/078205; mailed Feb. 17, 2011; Huawei Tech Co., Ltd., et al. (4 pgs.).

Foreign Communication From a Counterpart Application, Russian Application No. 2012122168/08, Russian Notice of Allowance dated Jul. 29, 2014, 10 pages.

* cited by examiner

METHOD, DEVICE, AND SYSTEM FOR SERVICE PRESENTATION

CROSS-REFERENCE TO RELATED APPLICATIONS

This application is a continuation of International Application No. PCT/CN2010/078205, filed on Oct. 28, 2010, which claims priority to Chinese Patent Application No. 200910211376.6, filed on Oct. 30, 2009, both of which are hereby incorporated by reference in their entireties.

FIELD OF THE INVENTION

The present invention relates to the field of billing technology in communication systems, and more particularly, relates to a method, a device and a system for service presentation.

DESCRIPTION OF THE RELATED ART

Currently, with the construction of GPRS, 3G network and the upgrade of mobile terminal, content based value-added services (such as, music, picture, game, stream media, multimedia message, or the like) have entered people's life at a rapid speed. The development and operation of content type services have attracted more and more attention from the operators.

In the operation process of existing content type services, generally, a user firstly logs on to a portal website on his/her own volition and visits content type services. Wherein, this portal website can be a portal website of Internet, a portal website of Mobile Internet or a portal system of enterprise application system, such as, Sohu, Sina, or other portal websites. Then, a service enabling component gathers user information and service information and reports the user information and service information to MDSP (Mobile Data Service Platform, Mobile Data Service Platform) which performs authenticating and rating. Finally, the user acquires the particular content type service through the service enabling component.

During the implementation of the present invention, the inventor has found at least the following problems in the prior art:

During the operation of the existing content type services, it generally has to rely on a user logging onto a portal website on his/her own volition to search, find and use by himself/herself, and the procedures like presentation cannot be realized.

SUMMARY OF THE INVENTION

The embodiments of the present invention provide a method, a device and a system for service presentation, which can flexibly realize the service presentation and improve the quality of user's experience.

The technical solutions employed by the embodiments of the present invention are as follows:

A method for service presentation, comprising:
receiving an authentication and rating request message transmitted from a service enabling component when a presentee accesses a presented content; and
performing authenticating and rating according to the authentication and rating request message and stored presentation information.

A device for service presentation, comprising:
a first receiving module for receiving a presentation request message;
an acquisition module for acquiring presentation information from said presentation request message;
a storage module for storing said presentation information;
a second receiving module for receiving an authentication and rating request message transmitted from a service enabling component when a presentee accesses a presented content;
an authentication and rating processing module for performing authenticating and rating according to said authentication and rating request message and the presentation information in said storage module.

A system for service presentation, comprising: a presenter, a portal, a mobile data service platform, a presentee, and a service enabling component, wherein,
said presenter is for initiating a service presentation to the presentee through the portal;
said portal is for composing a presentation request message according to the service presentation initiated by said presenter, and sending said presentation request message to the mobile data service platform;
said presentee is for accessing a presented content;
said service enabling component is for sending an authentication and rating request message to said mobile data service platform when said presentee accesses the presented content;
said mobile data service platform is for receiving the presentation request message sent from said portal, acquiring presentation information from said presentation request message and storing the presentation information, receiving an authentication and rating request message sent from the service enabling component when the presentee accesses the presented content, and performing authenticating and rating according to said authentication and rating request message and the stored presentation information.

By establishing a presentation interface between the mobile data service platform and the portal, the method, device and system for service presentation according to the embodiments of the present invention can achieve a presentation function that supports multiple billing modes and enhance the flexibility and accuracy of the billing of the service presentation. The mobile data service platform can clearly exhibit the relationship among the presenter, the presentee and the presentation, and can provide more plentiful billing and presentation information. The presentation relationship can be clearly expressed by managing the storage and update of the presentation information, which thus provides a material having much richer information for an operation support system to eventually generate a clear report and talk-list and enhances the user's experience quality.

BRIEF DESCRIPTION OF THE DRAWINGS

In order to more clearly describe the technical solution in the embodiments of the present invention or the technical solution in the prior art, the drawings that need to be used in the embodiments of the present invention or need to be used in the prior art will be introduced briefly. Obviously, the drawings in the following description are merely some embodiments of the present invention. For one of ordinary skill in the art, it is also possible to obtain other drawings based on these drawings, without paying any creative efforts.

DETAILED DESCRIPTION OF THE EMBODIMENTS

Below, in conjunction with the accompanying drawings of the present invention, the technical solution of the present invention will be clearly and completely described. Obviously, the described embodiments are merely partial embodiments of the present invention, rather than all the embodiments. Based on the embodiments of the present invention, all other embodiments that will be obtained by one of ordinary skill in the art without paying any creative efforts are also within the claimed scope of the present invention.

In order to make the advantages of the technical solution of the present invention more clear, the present invention will be described in detail in conjunction with the accompanying drawings and the embodiments.

Embodiment One

Figure 1:
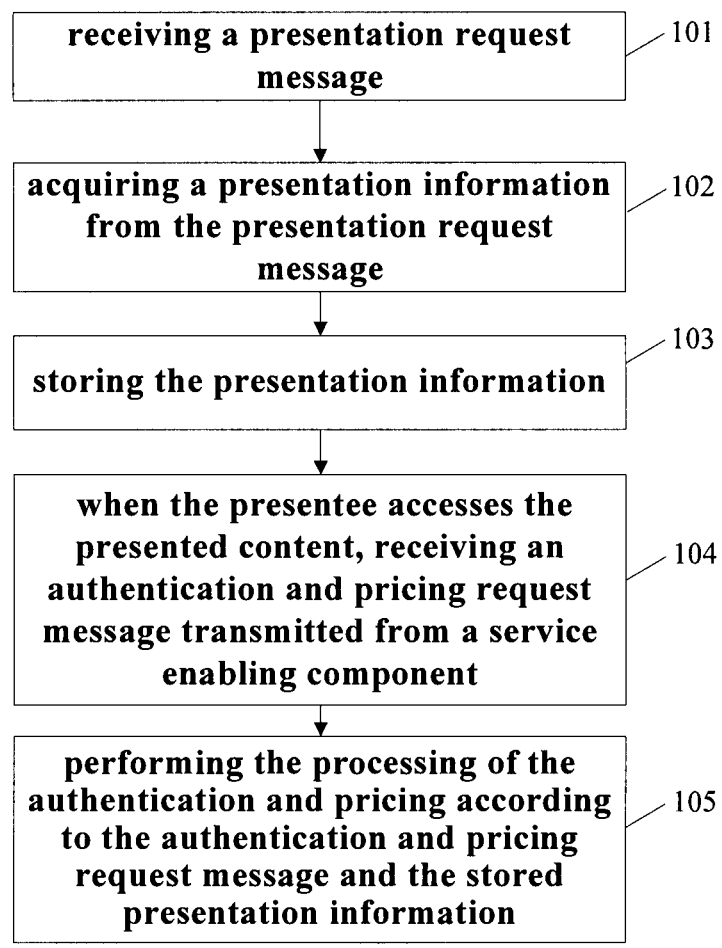
FIG. 1 is a flowchart of the method for service presentation provided by Embodiment One of the present invention.

This embodiment provides a method for service presentation. As shown in FIG. 1, this method for service presentation comprises:

101. Receiving a presentation request message.

Wherein, the presentation request message comprises, but not limited to, information about a user A, information about a user B, a presented content identifier, a presentation time and a presentation payment means, or the like. The presentation payment means includes, but not limited to, presenter permanent payment, presenter progressive payment, or the like.

102. Acquiring presentation information from the presentation request message.

Wherein, the presentation information comprises, but not limited to, information about a user A, information about a user B, a presented content name, a presentation time, presentation payment means, or the like. The presented content name can be recognized by the users.

103. Storing the presentation information.

104. Receiving an authentication and rating request message transmitted by a service enabling component when a presentee visits the presented content, requesting an ID authentication to the user A and the user B, and executing rating once the authentication is passed.

Wherein, the service enabling component can be a device such as short message centre gateway, WEB gateway, stream media gateway, for storing contents such as short message service, WEB service, stream media service, or for providing a passage for contents such as short message service, WEB service, stream media service; the presentee establishes a connection with the service enabling component when visiting presented content and obtains the presented content through the service enabling component.

105. Executing authenticating and rating according to the authentication and rating request message and the stored presentation information.

By establishing a presentation interface between the mobile data service platform and the portal, the method for service presentation according to the embodiments of the present invention can achieve a presentation function that supports multiple billing modes and enhance the flexibility and accuracy of the billing of the service presentation; the mobile data service platform can clearly exhibit the relationship among the presenter, the presentee and the presentation, and provide more plentiful billing and presentation information; the presentation relationship can be clearly expressed by managing the storage and update of the presentation information, which provides a material having much richer information for an operation support system to eventually generate a clear report and talk-list and enhances the users' experience quality.

Embodiment Two

In this embodiment, the presenter is a user A and the presentee is a user B.

Figure 2:
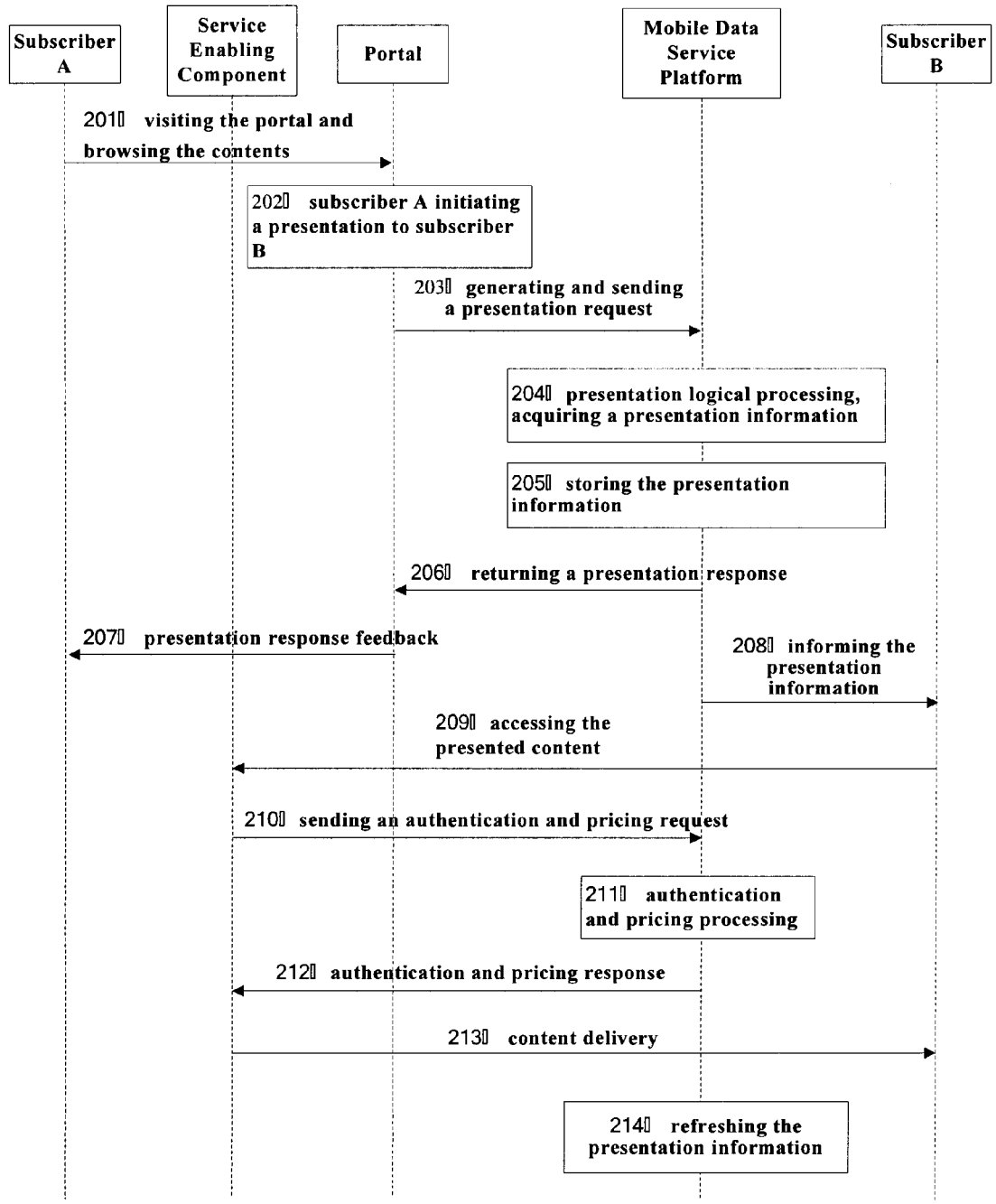
FIG. 2 is flowchart of the method for service presentation provided by Embodiment Two of the present invention.

As shown in FIG. 2, the method for service presentation comprises:

201. User A visits a portal and browses service information.

Wherein, operator's administrator and CP/SP's (content provider/service provider) administrator publish contents through a content management system provided by MDSP. After the content publication, MDSP will synchronize these contents with the service enabling component for deployment and meanwhile will synchronize relevant information with the portal for display. All the contents described in this embodiment are contents that have been published, synchronized and deployed.

202. User A initiates a presentation on the portal, and the presentee is user B.

203. The portal generates a presentation request message based on the presentation initiated by the user A, and sends the presentation request message to MDSP. The presentation request message includes, but not limited to, information about user A, information about user B, presented content identifier, presentation time, presentation payment means, or the like; the presentation payment means includes, but not limited to, presenter permanent payment, presenter progressive payment, or the like.

204. MDSP performs a presentation logical processing and obtains the presentation information according to the presentation request message.

Wherein, the presentation logical processing particularly can include: executing a user authentication to the user A and the user B, performing content authentication and/or repeating the presentation authentication. However, it is not limited to this.

The presentation information comprises, but not limited to, information about user A, information about user B, presented content name, presentation time, presentation payment means, or the like. The presented content name can be recognized by the users; the presentation payment means includes, but not limited to, presenter permanent payment, presenter progressive payment, or the like. When the presentation payment means is presenter progressive payment, the presentation information further comprises: progressive payment limit, progressive payment effective limit, or the like.

205. Storing the presentation information.

206. MDSP returns a presentation response to the portal.

207. The portal feeds back the presentation response to the user A.

208. MDSP informs the user B of the presentation information.

Wherein, the informing means include, but not limited to, a short message, a multimedia message, IVR (Interactive Voice Response, Interactive Voice Response), Email, WAP PUSH (service information). The presentation information may include, but not limited to, the presenter, the presentee, the description information about the presented contents and the acquiring means thereof (e.g. website of service enabling component or MDSP), the presentation time, the presentation payment means, or the like.

209. User B accesses the presented content through the service enabling component according to the received presentation information delivered from MDSP. Wherein, the content has been published, synchronized, and deployed.

210. The service enabling component sends an authentication and rating request message to MDSP.

211. MDSP performs authenticating and rating according to the authentication and rating request message and the stored presentation information.

Wherein, the authentication and rating processing particularly may include:

211a. according to the authentication and rating request message, querying the stored presentation information and determining whether these is a presentation relationship;

211b. if there is a presentation relationship, acquiring a payment means for the presentation relationship and determining the current payer according to the payment means and the effective limit;

211c. if there is no presentation relationship, setting a content user as the payer;

211d. performing rating to the payer and recording a detail record of consumption.

212. MDSP returns an authentication and rating response to the service enabling component.

213. The service enabling component delivers the content to user B according to the authentication and rating response.

214. After the service enabling component has delivered the content to user B, MDSP refreshes the stored presentation information.

Wherein, when the payment means in the stored presentation information is progressive payment and the limit for the progressive payment in the presentation information that has been refreshed by MDSP has already been used up, MDSP will remind user A and user B that that progressive payment is over. The reminding means may include, but not limited to, short message, multimedia message, IVR, Email, and WAP PUSH.

Table 1 shows a list of presentation information stored by MDSP.

TABLE 1

| Presenter | 13700007777 | 13700007777 | 13700007777 |
|---|---|---|---|
| Presentee | 13700008888 | 13700006666 | 13700009999 |
| Presented content | NBA Live Channel | NBA Live Channel | Download Andy Liu's Song |
| Presentation time | 20081201101102 | 20081101124632 | 20081214194339 |
| Presentation Payment Means | Presenter Permanent Payment | Presenter Progressive Payment | Presenter Progressive Payment |
| Total limit for progressive payment | — | Three months | 10 times |
| Effective limit for progressive payment | — | — | 7 times |

For example, the user 13700007777 presents a content of "Download Andy Liu's Song" to the user 13700009999 at 19:43:39 on Dec. 14, 2008. The payment means for this presentation is "the initiator progressive payment", the total limit for the progressive payment is 10 times, and before 19:43:39, on Dec. 14, 2008, the user 13700009999 has already enjoyed the content of "Download Andy Liu's Song" presented by user 13700007777 three times. Thus the effective limit for the progressive payment is 7 times. The user 13700009999 begins to use this content, and download for the initial 10 times are all paid by user 13700007777. After user 13700009999 has enjoyed the presented contents for 10-times, MDSP is responsible for reminding both the presenter (the user 13700007777) and the presentee (the user 13700009999) that the progressive payment is over. Thereafter, if the user 13700009999 continues to use this content, it has to be paid by the user 13700009999 himself/herself.

By establishing a presentation interface between the mobile data service platform and the portal, the method for service presentation according to the embodiments of the present invention can achieve a bonus function that supports multiple billing modes and enhance the flexibility and accuracy of the billing of the service presentation. The mobile data service platform can clearly exhibit the presenter, the presentee and the presentation relationship and provide more plentiful billing and presentation information. The presentation relationship can be clearly expressed by managing the storage and update of the presentation information, which provides a material having much richer information for an operation support system to eventually generate a clear report and talklist and enhances a user's experience quality.

Embodiment Three

Figure 3:
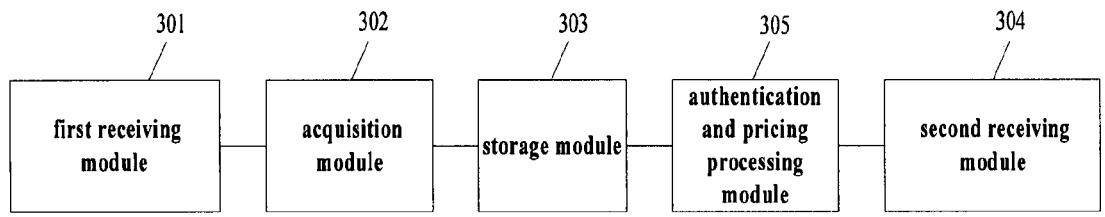
FIG. 3 is a diagram of the configuration of the device for service presentation provided by Embodiment Third of the present invention.

This embodiment provides a device for trigging giving service, as shown in FIG. 3, this device for trigging giving service comprises:

a first receiving module 301 for receiving a presentation request message. Wherein, the presentation request message includes, but not limited to, presenter information, presentee information, presented content identifier, presentation time, presentation payment means, or the like. The presentation payment means includes, but not limited to, presenter permanent payment, presenter progressive payment, or the like.

an acquisition module 302 for acquiring the presentation information in the presentation request message. Wherein, the presentation information includes, but not limited to, presenter information, presentee information, presented content name, presentation time, presentation payment means, or the like. The presented content name can be recognized by the users.

a storage module 303 for storing the presentation information.

a second receiving module 304 for receiving an authentication and rating request message sent by the service enabling component when the presentee accesses the presented content.

an authentication and rating processing module 305 for performing authenticating and rating according to the authentication and rating request message and the presentation information in the storage module 303.

In this embodiment, the device for service presentation is particularly embodied as MDSP, but is not limited to this.

By establishing a presentation interface between the mobile data service platform and the portal, the device for service presentation according to the embodiments of the present invention can achieve a presentation function that supports multiple billing modes and enhance the flexibility and accuracy of the billing of the service presentation. The mobile data service platform can clearly exhibit the relationship among the presenter, the presentee and the presentation and provide more plentiful billing and presentation information. The presentation relationship can be clearly expressed by managing the storage and update of the presentation information, which provides a material having much richer information for an operation support system to eventually generate a clear report and talk-list and enhances the user's experience quality.

Embodiment Four

Figure 4:
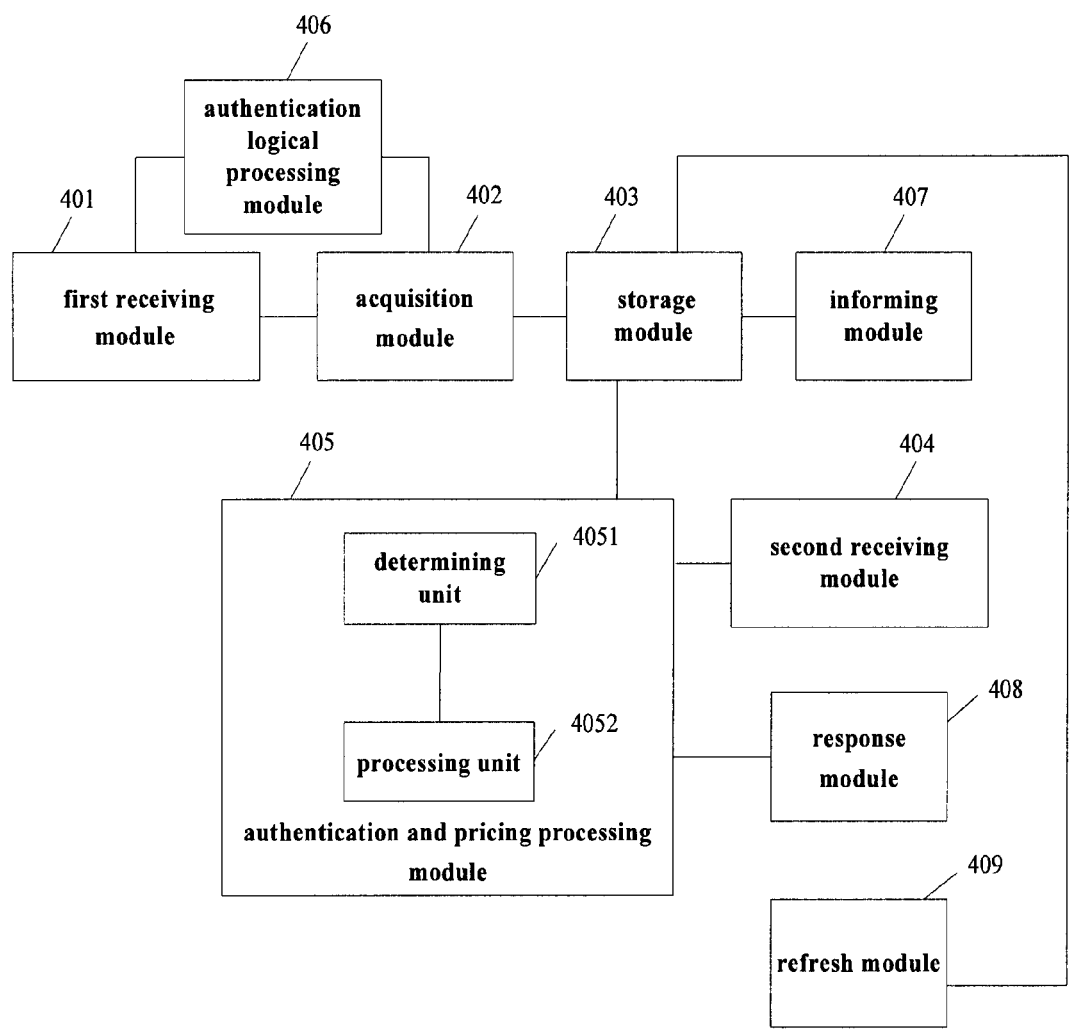
FIG. 4 is a diagram of the configuration of the device for service presentation provided by Embodiment Four of the present invention.

As shown in FIG. 4, this device for service presentation comprises:

a first receiving module 401 for receiving a presentation request message. Wherein, the presentation request message includes, but not limited to, presenter information, presentee information, a presented content identifier, a presentation time, presentation payment means, or the like. The presentation payment means includes, but not limited to, presenter permanent payment, presenter progressive payment, or the like.

an acquisition module 402 for acquiring presentation information from the presentation request message. Wherein, the presentation logical processing particularly may comprises: performing a user authentication to the presenter and the presentee, performing content authentication and repeating presentation authentication, but is not limited to this. The presentation information includes, but not limited to, presenter information, presentee information, presented content name, presentation time, presentation payment means, or the like. The presented content name can be recognized by the user. The presentation payment means includes, but not limited to, presenter permanent payment, presenter progressive payment, or the like. When the presentation payment means is presenter progressive payment, the presentation information further comprises: progressive payment limit, progressive payment effective limit, or the like.

a storage module 403 for storing the presentation information.

a second receiving module 404 for receiving an authentication and rating request message sent by the service enabling component when the presentee access the presented content.

an authentication and rating processing module 405 for performing authenticating and rating according to the authentication and rating request message and the presentation information in the storing module.

Further, the device may also comprise:

an authentication logical processing module 406 for performing a user authentication to the presenter and the presentee, performing content authentication and/or repeating presentation authentication.

Further, the device may also comprise:

an informing module 407 for informing the presentee of the presentation information. Wherein, the informing means includes, but not limited to, short message, multimedia message, IVR, Email, and WAP PUSH. The presentation information can include, but not limited to, presenter, presentee, description information about the presented content and acquiring means thereof, presentation time, presentation payment means, or the like.

Further, the device may also comprise:

a response module 408 for returning an authentication and rating response to the service enabling component;

a refresh module 409 for refreshing the stored presentation information after the service enabling component has delivered the content to the presentee according to the authentication and rating response.

Wherein, the authentication and rating processing module 405 comprises:

a determining unit 4051 for querying the presentation information in the storage module 403 and determining whether or not these is a presentation relationship according to the authentication and rating request message;

a processing unit 4052 for, when the determining unit 4051 determines there is a presentation relationship, acquiring a payment means for the presentation relationship and performing authenticating and rating to the determined presenter according to the payment means and the effective limit.

In this embodiment, the device for service presentation is particularly embodied as MDSP, but is not limited to this.

By establishing a presentation interface between the mobile data service platform and the portal, the device for service presentation according to the embodiments of the present invention can achieve a presentation function that supports multiple billing modes, and enhance the flexibility and accuracy of the billing of the service presentation. The mobile data service platform can clearly exhibit the relationship among the presenter, the presentee and the presentation, and can provide more plentiful billing and presentation information. The presentation relationship can be clearly expressed by managing the storage and update of the presentation information, which provides a material having much richer information for an operation support system to eventually generate a clear report and talk-list and enhances the user's experience quality.

Embodiment Five

Figure 5:
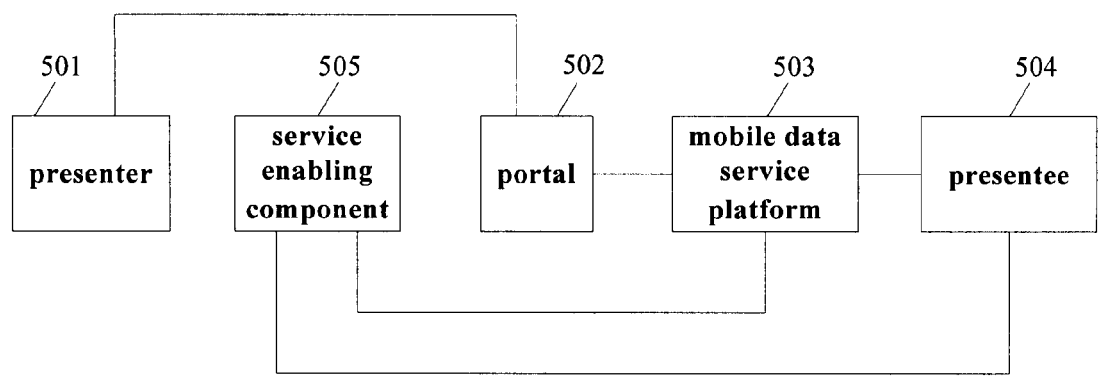
FIG. 5 is a diagram of the configuration of the device for service presentation provided by Embodiment Five of the present invention.

This embodiment provides a system for service presentation. As shown in FIG. 5, the system for service presentation comprises: presenter 501, portal 502, mobile data service platform 503, presentee 504, and service enabling component 505. Wherein, the presenter 501 is for initiating a service presentation to the presentee 504 through the portal 502;

the portal 502 is for composing a presentation request message according to the service presentation initiated by the presenter 501 and sending the presentation request message to the mobile data service platform 503;

the presentee 504 is for accessing the presented content;

the service enabling component 505 is for sending an authentication and rating request message to the mobile data service platform when the presentee 504 accesses the presented content;

the mobile data service platform 503 is for receiving a presentation request message sent by the portal 502, acquiring the presentation information from the presentation request message and storing the presentation information, receiving an authentication and rating request message sent by the service enabling component 505 when the presentee 504 accesses the presented content, and performing authenticating and rating according to the authentication and rating request message and the stored presentation information.

Wherein, the mobile data service platform 503 particularly can be used for performing a user authentication to the presenter 501 and the presentee 504, performing content authentication and/or repeating presentation authentication.

Wherein, the mobile data service platform 503 particularly can be used for informing the presentee 504 of the presentation information.

Further, the mobile data service platform 503 is also used for returning an authentication and rating response to the service enabling component 505 and refreshing the stored presentation information after the service enabling component 505 has performed the content delivery to the presentee 504 according to the authentication and rating response.

The service enabling component 505 is also used for delivering the presented content to the presentee 504 after receiving the authentication and rating response returned from the mobile data service platform 503.

The presentee 504 is also used for receiving the presented content delivered by the service enabling component 505.

By establishing a presentation interface between the mobile data service platform and the portal, the system for service presentation according to the embodiments of the present invention can achieve a presentation function that supports multiple billing modes and enhance the flexibility and accuracy of the billing of the service presentation. The mobile data service platform can clearly exhibit the relationship among the presenter, the presentee and the presentation, and can provide more plentiful billing and presentation information. The presentation relationship can be clearly expressed by managing the storage and update of the presentation information, which provides a material having much richer information for an operation support system to eventually generate a clear report and talk-list and enhances the user's experience quality.

The device and system for service presentation provided by the embodiments of the present invention can realize the method embodiment described above. The method, device and system for service presentation provided by the embodiments of the present invention can be applied in a content type service operation system, for presentation of content type service, but is not limited to this.

One of ordinary skill in the art can understand that, the entire or partial flow of the aforementioned method embodiment can be realized by a relevant hardware instructed through computer programs. The programs can be stored in a computer readable storage medium and can comprise the flow of the aforementioned method embodiment when being executed. Wherein, the storage medium can be a magnetic disc, an optical disc, a Read-Only Memory (Read-Only Memory, ROM) or a Random Access Memory (Random Access Memory, RAM), or the like.

The embodiments of the present invention have been described above, but the claimed scope of the present invention is not limited to these embodiments. Any one of ordinary skill in the art can easily conceive modifications or substitution within the technical scope disclosed by the present invention, and these modifications and substitutions are all within the claimed scope of the present invention. Therefore, the claimed scope of the present invention is defined by the attached claims.

What is claimed is:

1. A method for service presentation, comprising:
   receiving by a Mobile Data Service Platform (MDSP) a presentation request message that is generated and sent by a portal based on a service presentation, wherein the service presentation is initiated on the portal by a presenter to a presentee;
   obtaining presentation information from the presentation request message, wherein the presentation information includes information about the presenter, information about the presentee, and presentation payment means;
   storing the presentation information;
   receiving an authentication and rating request message transmitted from a service enabling component when the presentee accesses a presented content through the service enabling component;
   querying the stored presentation information according to the authentication and rating request message;
   acquiring a payment means for a presentation relationship when a presentation relationship exists; and
   performing authenticating and rating processing to a determined payer based on the payment means and an effective limit.

2. The method for service presentation of claim 1, wherein before obtaining the presentation information from the presentation request message, the method further comprises:
   performing a user authentication to the presenter and the presentee;
   performing content authentication; and
   repeating presentation authentication.

3. The method for service presentation of claim 1, wherein after obtaining the presentation information from the presentation request message, the method further comprises informing the presentee of the presentation information.

4. The method for service presentation of claim 3, wherein the presentation request message comprises presenter information, presentee information, a presented content identifier, a presentation time, and a presentation payment means.

5. The method for service presentation of claim 1, wherein after performing the authenticating and rating processing, the method further comprises:
   returning an authentication and rating response to the service enabling component; and
   refreshing the stored presentation information after the service enabling component has delivered the content to the presentee based on the authentication and rating response.

6. The method for service presentation of claim 1, wherein the service enabling component is a short message center gateway.

7. The method for service presentation of claim 1, wherein the service enabling component is a web gateway.

8. The method for service presentation of claim 1, wherein the service enabling component is a stream media gateway.

9. The method for service presentation of claim 1, wherein the service enabling component is configured to store short message service, web service, and stream media service.

10. The method for service presentation of claim 1, wherein the service enabling component is configured to provide a passage for contents of short message service, web service, and stream media service.

11. A device for service presentation, comprising:
   a computer processor configured to:
      receive a presentation request message that is generated and sent by a portal based on a service presentation, wherein the service presentation is initiated on the portal by a presenter to a presentee;
      acquire presentation information from the presentation request message, wherein the presentation information includes information about the presenter, information about the presentee, and presentation payment means;
      store the presentation information;
      receive an authentication and rating request message transmitted from a service enabling component when the presentee accesses a presented content through the service enabling component;
      query the stored presentation information;

determine whether or not a presentation relationship exists according to the authentication and rating request message;

acquire a payment means for the presentation relationship when determined that the presentation relationship exists; and perform the authentication and rating processing to a determined payer according to the payment means and an effective limit.

12. The device for service presentation of claim 11, wherein the computer processor is further configured to:

perform a user authentication to the presenter and the presentee;

perform content authentication; and repeat presentation authentication.

13. The device for service presentation of claim 11, wherein the computer processor is further configured to inform the presentee of the presentation information.

14. The device for service presentation of claim 11, wherein the computer processor is further configured to:

return an authentication and rating response to the service enabling component; and refresh the stored presentation information after the service enabling component has delivered the content to the presentee according to the authentication and rating response.

15. The device for service presentation of claim 11, wherein the service enabling component is a short message center gateway.

16. The device for service presentation of claim 11, wherein the service enabling component is a web gateway.

17. The device for service presentation of claim 11, wherein the service enabling component is a stream media gateway.

18. The device for service presentation of claim 11, wherein the service enabling component is configured to store short message service, web service, and stream media service.

19. The device for service presentation of claim 11, wherein the service enabling component is configured to provide a passage for contents of short message service, web service, and stream media service.

* * * * *